A. McGINN.
NUT LOCK.
APPLICATION FILED OCT. 25, 1911.
1,063,813.
Patented June 3, 1913.
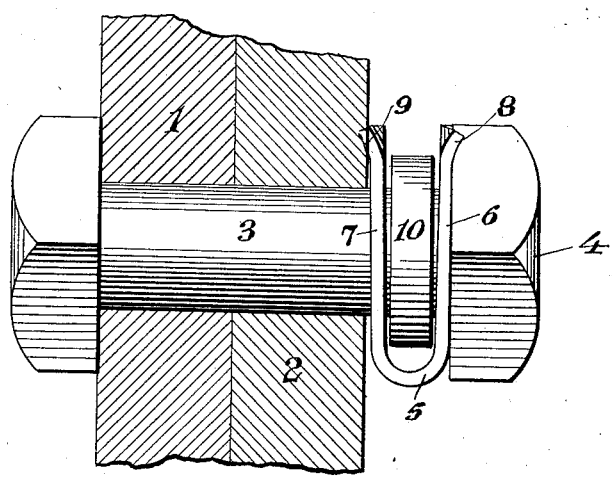
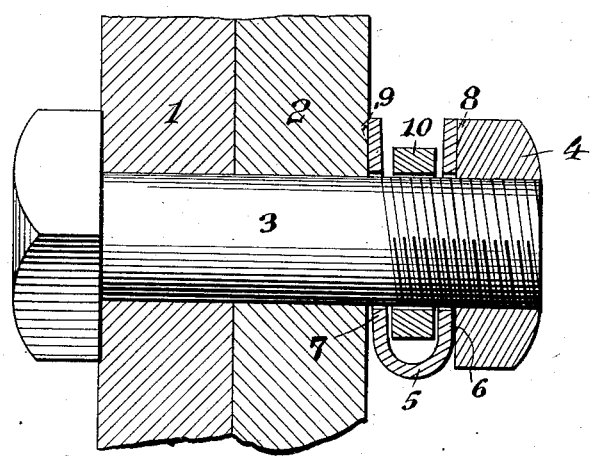
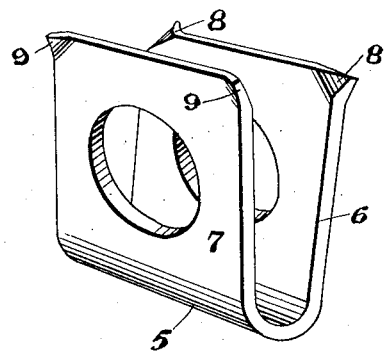
Witnesses
Inventor
Alexander McGinn
By Victor J. Evans
Attorney

UNITED STATES PATENT OFFICE.

ALEXANDER McGINN, OF WILLIAMSPORT, PENNSYLVANIA.

NUT-LOCK.

1,063,813.  Specification of Letters Patent.  Patented June 3, 1913.

Application filed October 25, 1911. Serial No. 656,661.

*To all whom it may concern:*

Be it known that I, ALEXANDER McGINN, a citizen of the United States, residing at Williamsport, in the county of Lycoming and State of Pennsylvania, have invented new and useful Improvements in Nut-Locks, of which the following is a specification.

This invention relates to improvements in nut locking devices.

In carrying out my invention it is my purpose to provide a simple and effective device comprising a spring clip which is inserted upon the bolt and which engages with both the nut and the article engaged by the bolt, so as to exert a pressure between the said article and the nut and to sustain the nut immovable upon the bolt.

A further object of the invention is to provide, in an invention of this class, a clip comprising a substantially U-shaped spring member, the same having its edges upturned to provide teeth, the teeth upon one of the arms of the said member adapted to be inserted within the wood or other article engaged by the nut, while the oppositely disposed teeth, being adapted to engage with the sides of the nut to sustain the said nut against accidental movement or rotation upon the bolt.

With the above recited objects and others of a similar nature in view, the invention resides in the novel construction, arrangement and combination of parts set forth in and falling within the scope of the appended claim.

In the drawings, Figure 1 is a side elevation of the improvement in its applied position. Fig. 2 is a central, sectional longitudinal view of the same. Fig. 3 is a perspective view of the locking element.

Referring now to the drawings in detail, the numerals 1 and 2 designate a pair of plates of a sub-structure, which are adapted to be connected together through the medium of the bolt 3. The bolt 3 is of the ordinary construction being formed with an enlarged head, and having its threaded extremity adapted to engage with an ordinary nut 4.

The numeral 5 designates my improved nut lock. This lock is constructed from a single piece of flattened resilient material, the same being bent upon itself to form a substantially U-shaped member, the arms 6 and 7 of the said U-shaped member are centrally provided with openings, the same being of a size sufficient to pass over the threaded bolt, and the said arms 6 and 7 have their ends set to provide oppositely extending pairs of teeth 8 and 9.

The numeral 10 designates a collar which is arranged between the arms 6 and 7 and which is also positioned upon the bolt. This collar is adapted to limit the movement of the resilient arms toward each other and also to tightly force the teeth 8 into engagement with the plate 2 of the sub-structure, and the teeth 9 against the sides of the nut 4.

Having thus described the invention what I claim is:—

In a lock nut, the combination of a sub-structure, a bolt secured to the substructure and a nut for the bolt, of a resilient lock member comprising an element substantially U-shaped in side elevation and having flat faces, the said faces being formed with openings whereby the lock may be arranged upon the bolt between the substructure and the nut, the corners of the free edges of each of the faces of the lock being bent to provide teeth, each of the pairs of teeth being extended outwardly therefrom, and the teeth upon the outer face of the lock contacting with the nut to provide a ratchet for the said nut, until the nut is sufficiently threaded upon the bolt to force the teeth of the opposite face of the lock into engagement with the substructure, and to then permit of the first named pair of teeth to engage with the sides of the nut to prevent the accidental removal of the nut from the bolt.

In testimony whereof I affix my signature in presence of two witnesses.

ALEXANDER McGINN.

Witnesses:
MARGARET MILLER,
MARGARET HAUG.

Copies of this patent may be obtained for five cents each, by addressing the "Commissioner of Patents. Washington, D. C."